United States Patent
Anders et al.

(10) Patent No.: US 7,161,992 B2
(45) Date of Patent: Jan. 9, 2007

(54) TRANSITION ENCODED DYNAMIC BUS CIRCUIT

(75) Inventors: Mark Anders, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 10/035,574

(22) Filed: Oct. 18, 2001

(65) Prior Publication Data

US 2003/0099300 A1    May 29, 2003

(51) Int. Cl.
*H03K 9/00*    (2006.01)

(52) U.S. Cl. .................... 375/316; 375/340; 326/38; 326/98

(58) Field of Classification Search ............... 375/259, 375/282, 333, 361, 364; 710/109; 326/95, 326/98, 97; 341/70
See application file for complete search history.

(56) References Cited

U.S. PATENT DOCUMENTS

| | | | | |
|---|---|---|---|---|
| 3,820,031 A * | 6/1974 | Smithlin | ...................... | 341/70 |
| 3,967,061 A * | 6/1976 | Dobias | ........................ | 375/361 |
| 4,229,823 A * | 10/1980 | Thomson et al. | ........... | 375/364 |
| 4,453,229 A * | 6/1984 | Schaire | ....................... | 710/109 |
| 4,525,848 A * | 6/1985 | Simpson | ..................... | 375/333 |
| 4,663,767 A * | 5/1987 | Bodlaj et al. | ................. | 375/282 |
| 5,646,557 A * | 7/1997 | Runyon et al. | ................ | 326/97 |
| 6,005,417 A | 12/1999 | Mehta et al. | | |
| 6,028,814 A | 2/2000 | Lim | | |
| 6,140,843 A | 10/2000 | Howard | | |
| 6,188,596 B1 | 2/2001 | Holst | | |
| 6,333,645 B1 * | 12/2001 | Kanetani et al. | ............... | 326/98 |
| 6,351,150 B1 | 2/2002 | Krishnamurthy et al. | | |
| 6,417,698 B1 | 7/2002 | Williams et al. | | |
| 6,453,399 B1 | 9/2002 | Wada | | |
| 6,559,680 B1 * | 5/2003 | Bhushan et al. | ............... | 326/95 |
| 6,717,448 B1 | 4/2004 | Heo et al. | | |
| 6,741,094 B1 | 5/2004 | Ogawa | | |
| 6,765,408 B1 | 7/2004 | Cheng et al. | | |
| 6,894,536 B1 | 5/2005 | Martin et al. | | |
| 6,990,035 B1 | 1/2006 | Redwine et al. | | |
| 2001/0052797 A1 * | 12/2001 | Bhushan et al. | ............... | 326/95 |
| 2003/0001184 A1 | 1/2003 | Anders et al. | | |
| 2003/0107411 A1 | 6/2003 | Martin et al. | | |
| 2005/0146357 A1 | 7/2005 | Anders et al. | | |
| 2005/0285631 A1 | 12/2005 | Goldman et al. | | |
| 2006/0140034 A1 | 6/2006 | Hsu et al. | | |

OTHER PUBLICATIONS

Burleson et al.; Low-Power Encodings for Global Communication in CMOS VLSI; IEEE Transactions on Very Large Scale Integration (VLSI) Systems; vol. 5, No. 4; Dec. 1997; pp. 444-455.*

(Continued)

*Primary Examiner*—Tesfaldet Bocure
*Assistant Examiner*—Sudhanshu C. Pathak
(74) *Attorney, Agent, or Firm*—Matthew C. Fagan

(57) ABSTRACT

A transition encoded dynamic bus includes an encoder circuit at the input to the bus and a decoder circuit at the output to the bus. The encoder circuit generates a signal indicative of a transition at the input to the bus rather than the actual value at the input. The decoder circuit decodes the transition encoded information to track the appropriate value to be output from the bus.

20 Claims, 2 Drawing Sheets

OTHER PUBLICATIONS

Burleson et al.; Coding a Terminated Bus for Low Power; 1995. Proceedings., Fifth Great Lakes Symposium on VLSI Mar. 16-18, 1995 pp. 70-73.*

Burleson et al.; Bus-Invert Coding Low-Power I/O; IEEE Transactions on Very Large Scale Integration (VLSI) Systems; vol. 5, No. 4; Dec. 1997; pp. 49-58.*

Anders, Mark, et al., "A Transition-Encoded Dynamic Bus Technique for High-Performance Interconnects", Symposium on VLSI Circuits. Digest of Technical Papers, pp. 16-17 (Jun. 13-15, 2002).

Anders, Mark, et al., "A Transition-Encoded Dynamic Bus Technique for High-Performance Interconnects", IEEE Journal of Solid-State Circuits, vol. 38, No. 5, pp. 709-714 (May 2003).

Stan, Mircea R., et al., "Bus-Invert Coding for Low-Power I/O", IEEE Transactions on Very Large Scale Integration (VLSI) Systems, vol. 3, No. 1, pp. 49-58 (Mar. 1995).

Hsu et al—U.S. Appl. No. 11/025,778 entitled Transition-Encoder Sense Amplifier filed Dec. 29, 2004.

* cited by examiner

TRANSITION ENCODED DYNAMIC BUS CIRCUIT

BACKGROUND

Dynamic CMOS interconnect drivers may be substituted for static CMOS drivers in high performance on-chip buses. In buses with static drivers, when neighboring wires switch in opposite directions, e.g., from Vss to Vcc on one wire and from Vcc to Vss on its neighbor, the voltage swing on the parasitic capacitor which exists inherently between the two wires is not Vcc−Vss. Rather, the voltage swing seen by the parasitic capacitor is doubled to (Vcc−Vss)*2. Due to the Miller effect, the effective capacitance seen by the wire is doubled, yielding a Miller Coupling Factor (MCF) of 2.0.

In buses with dynamic drivers, all wires are reset to a pre-charge state (for example, Vss) in a pre-charge portion of the clock cycle, and then may either remain at that state or switch to an opposite state (Vcc in this example) in an evaluate portion of the cycle. Since all wires in the bus are pre-charged to the same state, two neighboring wires cannot switch in opposite directions during evaluation, and the maximum voltage swing on the terminals of the parasitic capacitor between the two wires will be (Vcc−Vss). Thus, the MCF is reduced from 2.0 in static CMOS drivers to 1.0 in dynamic CMOS drivers, thereby reducing a large component of the wire's worst-case effective coupling capacitance.

A trade-off is that dynamic buses may consume more power than static buses. Because dynamic buses are reset to the pre-charge state each cycle, the power used by the bus depends on the actual value of the input, unlike static buses, which draw power only when the input value transitions. Thus, a dynamic bus will continue to use power for as long as the input value is HIGH, whereas a static bus would not.

DETAILED DESCRIPTION

Figure 1:
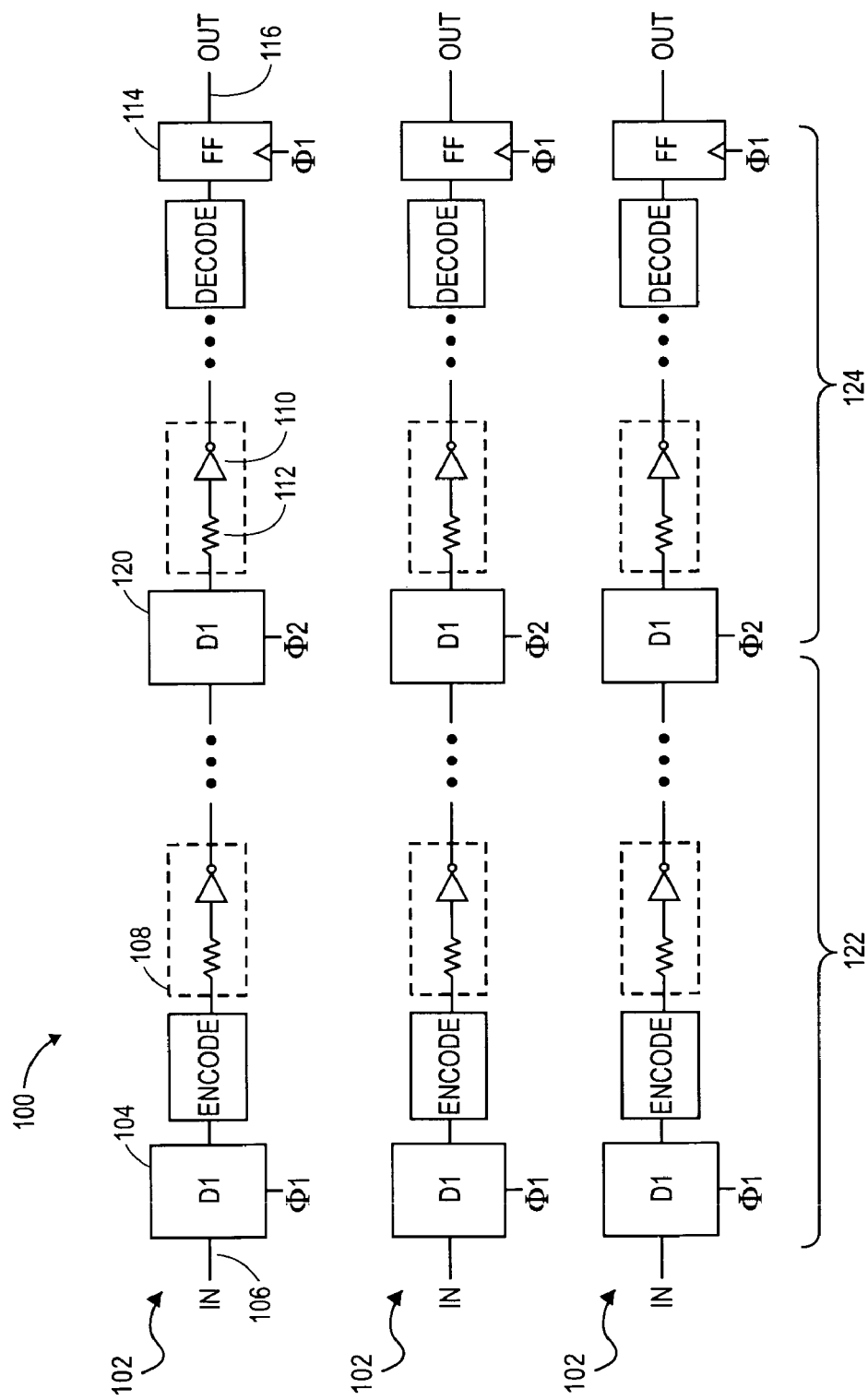
FIG. 1 is a block diagram of a transition encoded dynamic bus circuit according to an embodiment.

FIG. 1 illustrates an encoded dynamic bus 100 according to an embodiment. The bus includes multiple bus lines 102. The bus lines may be arranged as domino data paths, each bus line including a dynamic driver 104 at the input node 106, a series of inverting stages 108, each stage including a CMOS inverter 110 and a wire resistance 112, and a clocked flip flop (FF) 114 at the output node 116. A dynamic bus repeater 120 in the middle of the bus line divides the bus line into a front segment 122 and a rear segment 124.

An encoder circuit 130 may be provided at the front end of the bus line 102, coupled to the output node of the dynamic driver 104. A decoder circuit 132 may be provided at rear end of the bus line 102, coupled to the input node of the clocked FF 114. The encoder circuit translates transition activity at the input into an output logic state. Instead of a LOW input causing a LOW output, a LOW output in an exemplary transition encoding scheme indicates that no transition has occurred on the input. A HIGH output indicates that the input has transitioned from LOW to HIGH, or from HIGH to LOW in the exemplary encoding scheme. The decoder 132 then uses this encoded signal to reconstruct the original input to the encoder. By hiding the actual input value from the rest of the bus line and only indicating a transition on the input, the encoder scheme may reduce power consumed by the dynamic bus.

Figure 2:
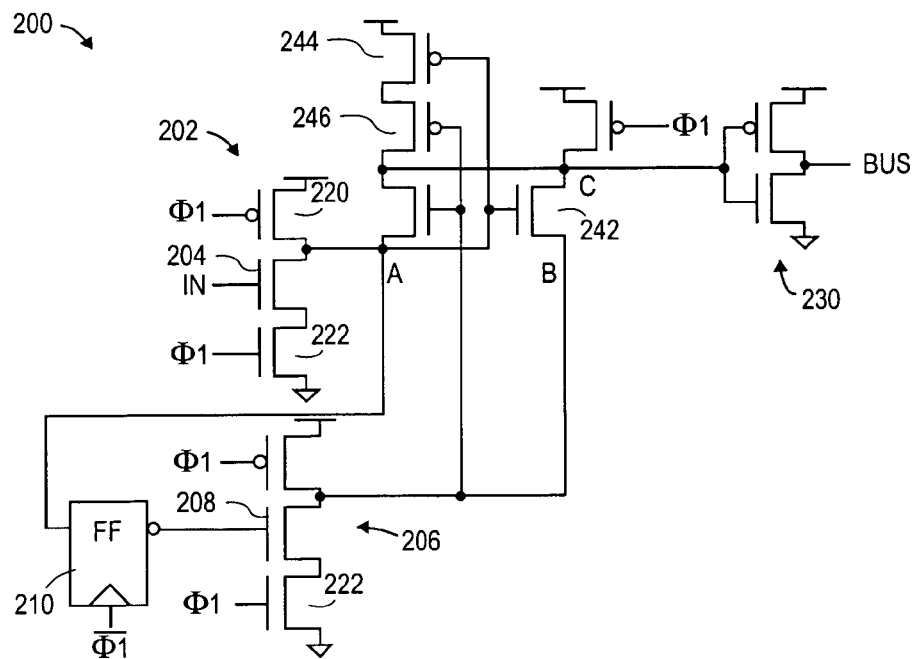
FIG. 2 is a schematic diagram of an encoder circuit according to an embodiment.

FIG. 2 illustrates an encoder circuit 200 according to an embodiment. A domino gate 202 includes an input transistor 204 controlled by the data input to the bus line 102. A domino gate 206 includes an input transistor 208 controlled by the value of the data input to the bus on the previous cycle, and supplied by a clocked FF 210, which stores the complement of the previous data input value. The domino gates 202 and 206 are clocked by a Φ1 clock signal, and the clocked FF 210 is clocked by the complement of the Φ1 clock signal, $\overline{\Phi 1}$.

During pre-charge, when Φ1 is LOW and $\overline{\Phi 1}$ is HIGH, node A, node B, and node C are all HIGH. The value on node A depends on the value of the current data input, and the value on node B depends on the value of the previous data input.

During evaluate, Φ1 rises and node A and node B conditionally transition to a LOW value, depending upon the current and previous inputs, respectively. As they fall, node C will also fall if nodes A and B exhibit different behavior, that is, one node falls while the other remains high. The value on node C is then inverted and driven onto the interconnect bus line. When Φ1 falls, the clocked FF 210 is triggered to latch the current data for the next cycle.

Consider the case when the data signal does not transition, and remains LOW in the previous and current cycles. When Φ1 rises, the PMOS transistors 220 in the domino gates 202 and 206 turn off, and the NMOS transistors 222 turn on. Since the signals on both input NMOS transistors 204 and 208 are low, both transistors remain OFF. Thus, the path to Vss through NMOS transistors 220 are closed, and the values on nodes A and B remain HIGH. With no discharge path for node C, the value on node C remains HIGH, which is inverted by an inverter 230. The encoder 200 outputs a LOW signal to the bus line 102, indicating that no transition has occurred at the input to the bus line.

Another case in which the input does not transition is when the input to the bus remains HIGH in the previous and current cycles. In this case, both input transistors 204 and 208 turn on, opening a discharge path for the signals on nodes A and B. As the signals on nodes A and B transition from HIGH to LOW, the NMOS transistors 240 and 242 below node C turn off, thereby closing the discharge path from node C to Vss through the domino gates 202 and 206. Also, the PMOS transistors 244 and 246 turn on in response to the signals on nodes A and B transitioning LOW. This opens the path to Vcc and pulls node C HIGH. This signal is inverted and a LOW signal is output to the bus line, again indicating no transition at the input.

The encoder 200 will output a HIGH signal to the bus if the data input transitions from LOW to HIGH or HIGH to LOW between the previous and current cycles. For example, if the data signal transitions from LOW to HIGH, the input transistor 204 on the domino gate 202 will turn on, and the input transistor 206 on the domino gate 204 coupled to the clocked FF 210 will remain off. When Φ1 rises, node A will fall from HIGH to LOW, causing the PMOS transistor 244 to turn on and the NMOS transistor 242 to turn off. Node B will remain HIGH, causing the PMOS transistor 246 to remain OFF and the NMOS transistor 240 to remain ON. The states of these transistors 246 (OFF) and 240 (ON) close the path to Vcc and open a discharge path to Vss, respectively, for the node C. Consequently, the node C will be pulled LOW, and the encoder will output a HIGH signal to the bus, indicating a transition at the input.

Alternatively, if the data signal transitions from HIGH to LOW, the input transistor 204 on the domino gate 202 will remain off, and the input transistor 206 on the domino gate 204 coupled to the clocked FF 210 will turn on. When Φ1 rises, node A will remain HIGH, causing the PMOS transistor 244 to remain OFF and the NMOS transistor 242 to remain ON. Node B will fall from HIGH to LOW, causing the PMOS transistor 246 to turn on and the NMOS transistor 240 to turn off. The states of transistors 244 (OFF) and 242 (ON) close the path to Vcc and open a discharge path to Vss, respectively, for the node C. Consequently, the node C will be pulled LOW, and the encoder will output a HIGH signal to the bus, indicating a transition at the input.

Figure 3:
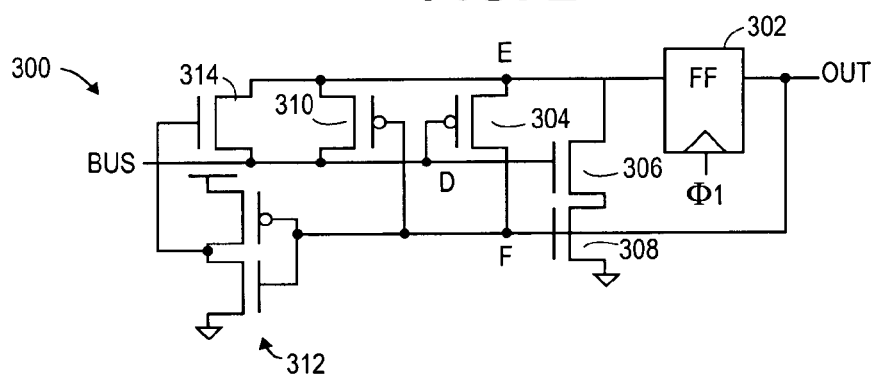
FIG. 3 is a schematic diagram of a decoder circuit according to an embodiment.

FIG. 3 illustrates a decoder circuit 300 according to an embodiment. The decoder 300 includes a clocked FF 302, which stores the encoded signal input from the bus on the previous cycle. The FF 302 is clocked by the Φ1 signal, which hides the pre-charge signal placed on the bus each cycle from the FF 302, and hence the decoder 300. The encoded signal input from the bus, at a node D, is coupled to the gates of a PMOS transistor 304 and an NMOS transistor 306. The PMOS transistor 304 is connected between the input of the clocked FF 302, at a node E, and the output of the clocked FF 302, at a node F. The signal on node F controls an NMOS transistor 308 and a PMOS transistor 310, which is connected between nodes D and E. The signal on node F is inverted by an inverter 312, the output of which controls an NMOS transistor 314 connected between nodes D and E.

When node D (from the bus) is LOW, the PMOS transistor 304 turns on, providing a path between nodes E and F. When node F (from FF 302) is LOW, the transistors 310 and 314 turns on, providing a path between nodes D and E. When both nodes D and F are LOW, both pull-down NMOS transistors 306 and 308 will be ON, providing a discharge path from node E to Vss.

The output of the decoder 300 will transition each cycle in which the signal on the input to the bus transitions. Table 1 illustrates an exemplary encoding/decoding operation.

TABLE 1

| Encoder | | | Decoder | |
|---|---|---|---|---|
| IN | PREV | BUS | FF | OUT |
| 0 | 0 | 0 | 0 | 0 |
| 1 | 0 | 1 | 0 | 1 |
| 0 | 1 | 1 | 1 | 0 |
| 0 | 0 | 0 | 0 | 0 |
| 1 | 0 | 1 | 0 | 1 |
| 1 | 1 | 0 | 1 | 1 |

As shown in Table 1, each transition at the input to the bus results in a transition at the output of the bus. The transition provides information as to whether there was a transition at the input, regardless of the actual value on the input to the bus, or the value stored in the FF 302 in the decoder 300.

The decoder must distinguish between a LOW to HIGH transition and a HIGH to LOW transition. This may be accomplished by maintaining synchronized state information in both the encoder 130 and the decoder 132.

The encoding scheme described above may reduce the power consumed by the dynamic bus to levels comparable to that of static buses. While the addition of the encoding and decoding circuits may produce an additional delay, the overhead is relatively small, and the bus may maintain most of the performance advantages associated with dynamic buses.

A number of embodiments have been described. Nevertheless, it will be understood that various modifications may be made without departing from the spirit and scope of the invention. For example, circuits other than those shown in FIGS. 2 and 3 may be used to implement the XOR operations utilized in the encoding and decoding operations. Accordingly, other embodiments are within the scope of the following claims.

The invention claimed is:

1. An apparatus comprising:
a first CMOS (Complimentary Metal Oxide Semiconductor) domino gate to control a signal at a first node based on a current input signal at an input node;
a second CMOS (Complimentary Metal Oxide Semiconductor) domino gate to control a signal at a second node based on a previous input signal at the input node; and
circuitry coupled to the first and second nodes to generate an encoded signal in response to a transition between a current input signal at the input node and a previous input signal at the input node.

2. The apparatus of claim 1, wherein the circuitry is to generate an encoded signal indicative of transition between a current input signal at the input node and a previous input signal at the input node.

3. The apparatus of claim 1, wherein the circuitry is to generate an encoded signal in response to no transition between a current input signal at the input node and a previous input signal at the input node.

4. The apparatus of claim 1, wherein the circuitry is to generate an encoded signal independent of values corresponding to a current input signal and a previous input signal.

5. The apparatus of claim 1, comprising a storage device to store a signal corresponding to a previous input signal at the input node.

6. The apparatus of claim 5, wherein the storage device is to receive and store a signal corresponding to a signal at the first node.

7. The apparatus of claim 1, wherein the first CMOS domino gate includes a transistor to be controlled based on a current input signal at the input node.

8. The apparatus of claim 1, wherein the second CMOS domino gate includes a transistor to be controlled based on a previous input signal at the input node.

9. The apparatus of claim 1, wherein the circuitry includes a first transistor to be controlled based on a signal at the first node and a second transistor to be controlled based on a signal at the second node.

10. The apparatus of claim 1, wherein the circuitry is to transmit on a line a signal corresponding to an encoded signal.

11. The apparatus of claim 1, comprising decode circuitry to decode an encoded signal to generate a decoded signal.

12. The apparatus of claim 11, wherein the decode circuitry is to decode an encoded signal based on the encoded signal and a previous decoded signal.

13. The apparatus of claim 11, wherein the decode circuitry includes a storage device to receive and store a signal corresponding to a previous decoded signal.

14. The apparatus of claim 11, wherein the decode circuitry includes a first transistor to be controlled based on an encoded signal and a second transistor to be controlled based on a previous decoded signal.

15. A method comprising:
controlling a signal at a first node by a first CMOS (Complimentary Metal Oxide Semiconductor) domino gate based on a current input signal at an input node;
controlling a signal at a second node by a second CMOS (Complimentary Metal Oxide Semiconductor) domino gate based on a previous input signal at the input node; and
generating an encoded signal based on signals at the first and second nodes in response to a transition between a current input signal at the input node and a previous input signal at the input node.

16. The method of claim 15, wherein the generating an encoded signal includes generating an encoded signal indicative of transition between a current input signal at the input node and a previous input signal at the input node.

17. The method of claim 15, comprising decoding an encoded signal.

18. A system comprising:
a line;
an encoder circuit coupled to the line, the encoder circuit including a first CMOS (Complimentary Metal Oxide Semiconductor) domino gate to control a signal at a first node based on a current input signal at an input node, a second CMOS (Complimentary Metal Oxide Semiconductor) domino gate to control a signal at a second node based on a previous input signal at the input node, and circuitry coupled to the first and second nodes to generate an encoded signal in response to a transition between a current input signal at the input node and a previous input signal at the input node, the circuitry to transmit on the line a signal corresponding to an encoded signal; and
a decoder circuit coupled to the line to decode an encoded signal.

19. The system of claim 18, wherein the circuitry is to generate an encoded signal indicative of transition between a current input signal at the input node and a previous input signal at the input node.

20. The system of claim 18, wherein the decoder circuit is to decode an encoded signal based on the encoded signal and a previous decoded signal.

* * * * *